United States Patent [19]

Norley et al.

[11] Patent Number: 4,549,218
[45] Date of Patent: Oct. 22, 1985

[54] ON-SCREEN DISPLAY

[75] Inventors: Ronald R. Norley; Gene K. Sendelweck, both of Indianapolis, Ind.; Keming J. Chen, San Diego, Calif.

[73] Assignee: RCA Corporation, Princeton, N.J.

[21] Appl. No.: 536,712

[22] Filed: Sep. 30, 1983

[51] Int. Cl.⁴ .............................................. H04N 5/68
[52] U.S. Cl. .................... 358/243; 358/169; 358/192.1
[58] Field of Search ............... 358/169, 243, 174, 188, 358/183, 903, 192.1

[56] References Cited

U.S. PATENT DOCUMENTS

| | | | |
|---|---|---|---|
| 4,126,884 | 11/1978 | Shanley, II | 358/21 |
| 4,167,025 | 9/1979 | Willis | 358/243 |
| 4,253,110 | 2/1981 | Harwood | 358/243 |
| 4,295,166 | 10/1981 | Shanley, II | 358/243 |
| 4,338,623 | 7/1982 | Asmus et al. | 358/22 |
| 4,366,502 | 12/1982 | Shiu | 358/192.1 |

OTHER PUBLICATIONS

Article titled, "Combined Color RGB Insert Card for the Compact Universal Chassis," Grundig Technical Information, vol. 28, Nos. 5/6, 1981, pp. 333-338 (with translation).

Primary Examiner—Tommy P. Chin
Attorney, Agent, or Firm—P. J. Rasmussen; P. M. Emanuel; R. H. Kurdyla

[57] ABSTRACT

To prevent undesired bending of vertical bar type information displayed on the screen of a kinescope due to kinescope beam current variations, modifying circuits are provided for reducing the beam current threshold level of an automatic beam current limiter stage to a lower threshold level whenever vertical bar type information is displayed.

15 Claims, 1 Drawing Figure

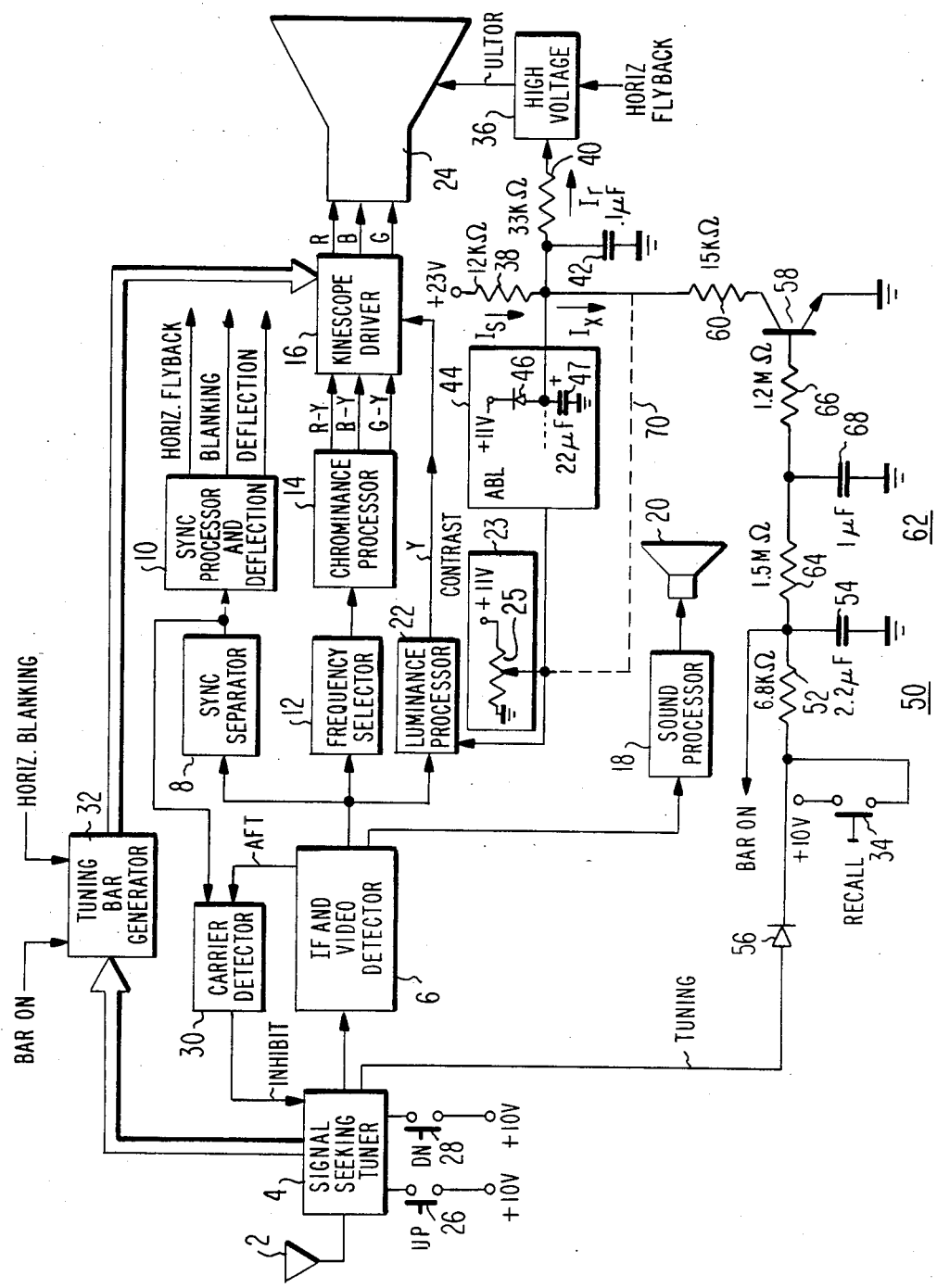

ON-SCREEN DISPLAY

The present invention relates to the display of graphic information by an image reproducing device such as a kinescope and, in particular, to reducing current drawn by the image reproducing device during time periods when graphics are displayed for reducing image distortions.

In some television (TV) receivers, in particular those providing for remote-control operation by a viewer, and on-screen display of the status of an operating function, such as channel identification is a desirable feature. In one type of on-screen channel identification system described in U.S. Pat. No. 4,241,361 (Kamiya) entitled "Tuning Voltage Display Device For A Color Television Receiver With An Electronic Tuner", a vertical bar is produced on the face of the kinescope at a horizontal position which indicates the channel to which the TV receiver is tuned. As the TV tuning voltage is changed during the tuning process, the vertical position of the bar moves across the face of the kinescope so as to continuously provide an indication of the tuning process. TV receivers employing this type of channel indicator typically include a feature whereby the viewer may "recall" the channel indicating bar so that it is displayed on the screen of the kinescope along with the picture of the presently tuned channel so as to remind the viewer the identification of the selected channel.

It has been noted by the present inventors that when there are bright portions in the reproduced picture, high kinescope beam currents can degrade the performance of TV receiver deflection circuits, which are operatively associated with the kinescope, so as to cause bending of a concurrently displayed vertical tuning bar. The bending is most severe at the edges of the screen of the kinescope since it is here that errors in the horizontal scanning rate are most noticeable.

Typically, TV receivers include an automatic beam current limiter, such as the type described in U.S. Pat. No. 4,167,025 (Willis) entitled "Automatic Peak Beam Current Limiter", for sensing excessive beams current (i.e. beam current which exceeds a preset threshold level) and deriving a control signal which is applied so as to reduce kinescope current conduction. Although automatic beam current limiters of this type may include both an average current and a peak current sensing circuit, they necessarily include preset threshold levels which must be exceeded before reduction in kinescope conduction occurs. Some TV receiver circuits, such as the deflection circuits, may be particularly sensitive to high levels of beam current and may therefore be adversely affected at beam current levels which do not exceed the preset levels. Increased horizontal scan width and the attendant bending of displayed vertical bars are visible examples of some of these adverse effects.

The preset levels for automatic beam current limiting the kinescope are optimized for normal video, i.e., such that video is generally reproduced at levels of beam current which are near but do not exceed the threshold levels. This is a subjective setting which will provide the brightest possible acceptable picture but, may occasionally cause bending of the vertical information towards the edges of the kinescope. Fortunately, the viewers attention is not steadily directed at the edges of the kinescope and any slight bending of vertical information would not be perceptible under most operating conditions.

However, when the viewer operates the "recall" feature of the channel indicator, the preset threshold levels of the automatic beam current limiter are no longer proper since the viewers attention is specifically directed at the vertical tuning bar displayed on the screen of the kinescope and brightness variations within the accompanying picture may result in undesired bending of the tuning bar. This would be particularly upsetting to the viewer since the accuracy of the position of the vertical tuning bar is being relied upon by the viewer for indicating the selected channel. Additionally, distortion of the tuning bar is esthetically displeasing and may lead the viewer to request an unnecessary service call.

According to the present invention, in a video signal reproducing system including an image reproducing device for displaying an image in response to video signals and also for displaying graphic information which may be superimposed on the image or substituted for a portion of the image, apparatus is provided for reducing maximum kinescope beam current conduction when graphics are displayed. More specifically, in response to a viewer operation which causes a display of graphic information, such as a vertical tuning bar, means are provided for lowering the threshold level of a beam current limiter from the level which was optimum for normal video.

The single FIGURE of the drawing shows, partially in block diagram form and partially in schematic diagram form, a general arrangement of a color television receiver employing apparatus constructed in accordance with the present convention.

The color television receiver shown in the FIGURE includes an antenna 2 for receiving VHF and UHF RF signals. A signal seeking tuner 4 locates RF signals corresponding to television channels in the receiving location and converts them to an IF signal. If IF signal is filtered, amplified and demodulated to provide a composite video signal at the output of IF amplifier and detector circuitry 6. The composite video signal contains luminance, chrominance, sound and synchronizing components.

A sync separator 8 serves to separate the synchronizing (sync) component including horizontal and vertical synchronization pulses from the composite video signal. The synchronization pulses are further processed by sync processing and deflection circuitry 10 to provide horizontal and vertical deflection signals including horizontal flyback signals, and horizontal and vertical blanking signals.

A frequency selection stage 12 (e.g., a bandpass filter) couples the chrominance component of the composite video signal to chrominance signal processing stage 14 (e.g., including amplifier and demodulator stages) to derive R-Y, B-Y and G-Y color difference signals. These signals are applied to respective inputs of a kinescope driver stage 16.

Sound components of the IF signal are processed by a sound processor 18 to derive an audio signal which is reproduced by a loudspeaker 20.

The luminance component of the composite video signal is amplified and otherwise processed by a luminance signal processor 22 for supplying a luminance signal Y to a respective input of kinescope driver stage 16, where the luminance signal is combined with the color difference signals from chrominance stage 14 to form R, B and G color signals. These signals are then coupled to signal inputs (e.g., cathode electrodes) of a kinescope 24 for reproducing a color image of the received video signal. A contrast control stage 23 includes a potentiometer 25 for providing a variable DC voltage at its wiper which is applied to luminance processor 22 for changing the peak-to-peak signal level (contrast) of the luminance signal. The viewer may manually operate potentiometer 25 to adjust the contrast of the reproduced image.

The signal seeking and channel identification operation of the tuner will now be described in detail. The signal seeking operation is initiated when a user depresses one of an UP switch 26 of DN (down) switch 28 which causes a ramp generator (not shown) of signal seeking tuner 4 to generate an increasing or decreasing, respectively, tuning voltage ($V_t$). As the tuning voltage is swept, components of the IF and audio signals are examined by a carrier detector 30 to determine if a channel has been located. Detector 30, by way of example, may examine the condition of an automatic fine tuning voltage representing the frequency deviation of the picture carrier from its nominal value (e.g., 45.75 MHz in the United States) generated by IF section 6 and may also be responsive to the synchronization components of the video signal generated by sync separator 8 for determining when a channel has been properly tuned. When a channel has been located, carrier detector 30 provides an inhibit signal to tuner 4 which stops the tuning voltage from changing further.

Channel identification is provided by a tuning bar generator 32 which is responsive to the tuning voltage, VHF and UHF band indication signals, horizontal blanking pulses and a BAR ON signal (the generation of which will be described later on) for providing output signals to kinescope driver stage 16 which produce a vertical bar on the screen of kinescope 24 having an instantaneous horizontal position determined by the magnitude of the tuning voltage and a color dependent on the band indication signal. As the tuning voltage is being increased or decreased to seek a channel, the bar moves to the left or right, respectively. When a channel has been located the bar stops its horizontal movement. The channel number of the channel that has been tuned can be determined by reference to channel numbers printed along the bottom of a mask (not shown) which surrounds kinescope 24. Tuning bar generator 32 may include a ramp generator which is initiated by each horizontal blanking pulse and provides an output pulse of predetermined duration when the ramp voltage equals the tuning voltage. The duration of the output pulse establishes the width of the tuning bar. When a RECALL pushbutton 34 is depressed, the vertical tuning bar reappears, concurrently with the picture presently being viewed, for identifying the presently selected channel. Further details of the construction and operation of a signal seeking tuning system including vertical tuning bar channel identification apparatus suitable for use in the embodiment of the present invention, is described in U.S. Pat. No. 4,366,502 (Shiu) entitled "Bar Type Channel Identification Apparatus For a Television Receiver".

High operating voltages for focus (not shown) and ultor electrodes of kinescope 24 are provided by a high voltage supply 36 in response to positive, periodic horizontal flyback pulses occurring during horizontal retract scanning intervals. A current supply, including a source of positive direct voltage (+23 volts) and a current determining resistor 38, provides a supply current $I_s$ and is coupled to a D.C. input of high voltage stage 36 via a resistor 40. The current flowing in resistor 40 is representative of the beam current (i.e., ultor current) demand of the kinescope in response to the luminance and chrominance signals. This current is sometimes referred to as a "resupply" current (i.e., a current coupled via the high voltage stage to recharge or resupply the ultor electrode voltage of the kinescope when depleted as a result of beam current conduction) and is therefore labelled as $I_r$. The resupply current typically includes current pulses recurring at the horizontal line scanning rate. A capacitor 42 is connected to the junction of resistors 38 and 40 for filtering horizontal rate voltages which the horizontal rate current pulses tend to produce.

An automatic beam current limiter (ABL) 44 is connected to the junction of resistors 38 and 40 for sensing when the resupply current $I_r$ exceeds a predetermined threshold level indicating the presence of excessive beam current demand. ABL stage 44 then develops an output control signal in accordance with the magnitude of the excessive beam current. This control signal is applied to luminance processor 22 in such a manner as to control the luminance signal to reduce excessive beam currents. In the illustrated embodiment, this control signal is applied to the wiper of contrast control potentiometer 25 for reducing the A.C. peak-to-peak level (contrast) of the luminance signal in proportion to the amount the resupply current exceeds the predetermined threshold level. An ABL stage and its coupling to the contrast control of the luminance signal processor in a manner for reducing excessive kinescope beam current is described in greater detail in U.S. Pat. No. 4,126,884 (Shanley) entitled "Kinescope Beam Current Limiter Employing Automatic Sequential Control Of Image Contrast And Brightness To Limit Beam Current". As indicated in this patent, the D.C. level (brightness) of the luminance signal may also be shifted in a direction to reduce excessive beam currents when the resupply current exceeds the predetermined threshold level.

During normal operating conditions, the junction between a diode 46 and a capacitor 47 connected in series between a source of supply voltage, shown as +11 V.D.C, and signal ground clamps the voltage at the input of ABL stage 44 to +11 volts plus the voltage drop across diode 46 (approximately +0.6 volts), of +11.6 volts.

Under these conditions, the value of resistor 38 and the voltage drop thereacross (+23 V.D.C.−11.6 V.D.C. or +11.4 V.D.C.) determine the normal level of supply current $I_s$ (approximately 1.0 milliamperes). Supply current $I_s$ divides between conductive diode 46 and the D.C. input of high voltage source 36 in accordance with the beam current demand of kinescope 24 as manifested by the level of resupply current $I_r$. As long as the beam current is not excessive, enough current is supplied to clamp diode 46 to keep it conductive and in response to the +11.6 V.D.C. developed at the input of ABL stage 44 the control signal output from ABL stage 44 is inhibited and the luminance signal is processed in normal fashion by luminance processor 22.

When the beam current becomes excessive there is insufficient supply current $I_s$ to keep diode 46 conducting. Under these conditions the positive plate of capacitor 47 is no longer clamped by diode 46 to +11.6 V.D.C. and its voltage decreases to a less positive level at a rate determined by the amount by which the predetermined threshold current level, determined by supply current $I_s$, is exceeded. ABL stage 44 responds to this less positive voltage at its input by providing a corresponding output control signal which, as previously noted, controls the peak-to-peak level of the luminance signal in a direction to cause kinescope 24 to conduct proportionately less beam current.

As previously noted, the predetermined threshold level for beam current limiting is a subjective level determined for providing the brightest possible acceptable picture but which, may occasionally cause bending of vertical information displayed towards the edges of the face of the kinescope. When the viewer presses the RECALL button 34 to recall the vertical tuning bar in order to refresh his memory as to which channel is presently being viewed, the preset threshold level of the automatic beam current limiter may no longer be optimum since brightness variations within the reproduced picture may cause undesired bending of the vertical tuning bar. This is especially undesirable since the viewer's attention is specifically directed at the tuning bar. This undesired bending of the tuning bar is eliminated in accordance with the principles of the present invention, by automatically reducing the beam current limiter threshold level whenever vertical tuning bars (or in general, any graphics) are displayed on the face of the kinescope.

More specifically, tuner 4 includes logic circuitry (not shown) for providing a TUNING indication signal having a high logic level (+10 volts) when the tuner is seeking a channel. The logic circuit may comprise, for example, a flip-flop which is set in response to the closure of either one of the UP 26 or DN 28 pushbuttons for providing the high logic level signal and reset by the output of carrier detector 30 when the tuning operation is complete. A lowpass filter 50 includes a resistor 52 and a capacitor 54 responsive to the TUNING signal, coupled to it via an isolation diode 56, and the RECALL pushbutton 34 for generating the BAR ON signal at its output. The BAR ON signal is coupled to tuning bar generator 32 for enabling it to supply the output signals which are coupled to kinescope driver 16 for producing the vertical tuning bar display.

The collector-emitter current path of a transistor 58 is coupled via a resistor 60 between the junction of resistors 38 and 40 and signal ground. The BAR ON signal from filter 50 is coupled to the base electrode of transistor 58 via a further filter 62 including series connected resistors 64 and 66 and a shunt connected capacitor 68. In response to the high level of the BAR ON signal, transistor 58 is rendered conductive and diverts a portion ($I_x$) of the supply current $I_s$. Under these conditions diode 46 will become non-conductive (unclamped) at a lower level of resupply current $I_r$, than if transistor 58 were not conductive. Accordingly, beam currents which would have ordinarily distorted the vertical tuning bar will be inhibited.

Filter 62 delays the operation of transistor 58 when the BAR ON signal is initially generated and thereafter when it is terminated. The value of the components of filter 50 are chosen so that capacitor 54 charges relatively quickly to a voltage substantially greater than that necessary to enable bar generator 32 and transistor 48 is rendered conductive approximately ¼ to ½ second after generator 32 enabled. When pushbutton 34 is no longer depressed or when the tuner is no longer signal seeking, diode 56 is reverse biased and a high impedance is presented at the input of filter 50. Under these conditions capacitor 58 discharges relatively slowly via high impedance resistors 64 and 66 and the base-emitter junction of transistor 58 to ground. After about 4 seconds, capacitor 54 discharges to a level insufficient to keep generator 32 enabled and the tuning bar display is terminated. After about an additional 5 or 6 seconds, the base current to transistor 58 is insufficient to keep transistor 58 conductive. When transistor 58 ceases conduction, the predetermined threshold level of ABL stage 44 is returned to normal. The delayed turn-off of transistor 58 helps prevent viewer association of any picture contrast changes with the tuning bar display which might prompt a service call.

While the invention has been described in terms of a preferred embodiment, it should be recognized that various modifications can be made by persons skilled in the art without departing from the scope of the invention. For example, ABL stage 44 can cause reduced beam current by operating on either one or both of the contrast and brightness portions of the luminance signal. Further, in this respect, switching stage 58 can operate directly on the contrast or brightness controlling portions (as is illustrated by dashed line 70). However, in this case, the contrast or brightness will be reduced even if the beam current for a particular image is not excessive and may therefore produce a less than optimum image. Finally, component values and other examples of operating parameters mentioned in the specification are an aid to understanding the invention and are not intended to be limiting.

What is claimed is:

1. In a system including a signal processing channel for processing video signals representative of conventional televised scenes and auxiliary signals representative of graphics and including an image reproducing device for reproducing conventional scenes in response to said processed video signals and graphics in response to said processed auxiliary signals, and means for sensing current drawn by said image reproducing device which is responsive to the amplitude characteristics of said processed video and auxiliary signals, apparatus for modifying said current drawn by said image reproducing device comprising:
   means coupled to said signal processing channel for modifying the signal translation characteristics of said signal processing channel to reduce the level of said current drawn by said image reproducing device;
   means for generating a control signal whenever said graphics are to be reproduced;
   means coupled to said signal translation characteristic modifying means and responsive to said control signal for controlling said signal translation characteristic modifying means to further reduce the characteristics of said processed video signal in said signal processing channel whenever graphics are to be displayed.

2. The apparatus of claim 1 wherein:
   said modifying means changes and amplitude characteristic of said video signals and said auxiliary signals whenever graphics are displayed.

3. The apparatus of claim 2 wherein:
   said modifying means includes contrast control for means altering the peak-to-peak amplitude of said video and auxiliary signals.

4. The apparatus of claim 1 wherein:
   said reproducing means comprises a kinescope; and said control means includes an automatic kinescope beam current limiter responsive to the level of beam current drawn by said kinescope and coupled to said modifying means for modifying the signal translation characteristics of said signal processing channel in accordance with the amount said kinescope beam current exceeds a predetermined threshold level and means for changing the predetermined threshold in response to said control signal whenever graphics are displayed.

5. The apparatus of claim 4 wherein:
said threshold changing means includes a controllable conduction device the conduction of which is changes in response to said control signal whenever graphics are displayed.

6. The apparatus of claim 5 wherein:
said modifying means includes contrast control means for altering the peak-to-peak amplitude of said video and auxiliary signals.

7. The apparatus of claim 1 wherein:
said control means includes filter means coupled between said control signal generating means and said modifying means for delaying the response of said modifying means to said control signal.

8. The apparatus recited in claim 7 wherein:
said filter means provides a first delay at the generation of said control signal and a second delay at the end of said control signal.

9. The apparatus of claim 8 wherein:
said second delay is at least twice as long as said first delay.

10. In a television receiver including a signal seeking tuner responsive to the magnitude of a tuning signal for tuning RF carriers to produce an IF signal; signal processing means responsive to said IF signal for generating at least one video signal; a kinescope for reproducing an image in response to said video signal; tuning identification apparatus including a bar generator coupled to said signal processing means for producing a vertical tuning bar on the face of said kinescope having a horizontal position determined by the magnitude of said tuning signal; and means for generating an indication signal whenever said tuning bar is displayed; an automatic kinescope beam current controlling means comprising;

means for deriving a control signal indicative of variations in the magnitude of kinescope beam current above an established threshold level;
means for utilizing said control signal to limit kinescope beam current conduction in said signal processing means in accordance with the magnitude of said control signal; and
means coupled to said tuning identification apparatus and said deriving means for rendering said established threshold level in response to said indication signal.

11. The apparatus of claim 10 wherein:
said reducing means includes a controllable conduction device, the conduction of which is changed in response to said indication signal.

12. In a system including a signal processing channel for processing video signal representative of conventional televised scenes and auxiliary signals representative of graphics and including an image reproducing device for reproducing conventional scenes in response to said processed video signal and graphics in response to said processed auxiliary signals, and means for sensing current drawn by said image reproducing device which is responsive to the amplitude characteristics of said processed video and auxiliary signals, apparatus for modifying said current drawn by said image reproducing device comprising:

means responsive to said current drawn by said image reproducing device for modifying the signal translation characteristics of said signal processing channel to reduce the level of said current drawn by said image reproducing device whenever said drawn current exceeds a predetermined threshold level;
means for generating a control signal whenever said graphics are to be reproduced; and
means, coupled to be responsive to said control signal for providing an output signal to said modifying means for reducing said predetermined threshold level whenever said auxiliary signal is to be reproduced.

13. The apparatus of claim 12 wherein:
said reducing means includes a controlled conduction device, the conduction of which is changed in response to said control signal.

14. The apparatus of claim 13 wherein:
said modifying means includes contrast control means for altering the peak-to-peak amplitude of said video and auxiliary signals, said contrast control means reducing said amplitude in response to said control signal.

15. The apparatus of claim 14 wherein:
said graphics are displayed on said kinescope concurrently with at least a portion of said conventional televised scene.

* * * * *